United States Patent [19]
Zupančič

[11] 3,878,243
[45] Apr. 15, 1975

[54] PROCESS FOR PREPARING PERCHLOROMETHYLMERCAPTANE

[75] Inventor: Boris Zupančič, Ljubljana, Yugoslavia

[73] Assignee: LEK tovarna farmacevtskih in kemicnih izdelkov, Ljubljana, Yugoslavia

[22] Filed: Oct. 3, 1973

[21] Appl. No.: 403,302

[30] Foreign Application Priority Data
Oct. 23, 1972 Yugoslavia............................ 2635/72

[52] U.S. Cl. ............................................ 260/543 H
[51] Int. Cl. ............................................ C07c 145/00
[58] Field of Search .............................. 260/543 H

[56] References Cited
OTHER PUBLICATIONS
Helfrich et al., J.A.C.S. 43, (1921), pp. 591–594.

*Primary Examiner*—Lorraine A. Weinberger
*Assistant Examiner*—Richard D. Kelly
*Attorney, Agent, or Firm*—Pollock, Philpitt & Vande Sande

[57] ABSTRACT

Process for preparing perchloromethylmercaptane from carbon disulphide and chlorine in the presence of a heavy metal salt catalyst which is soluble in the carbon disulphide and in homogeneous mixture.

8 Claims, No Drawings

PROCESS FOR PREPARING PERCHLOROMETHYLMERCAPTANE

The present invention relates to a process for preparing perchloromethylmercaptane from carbon disulphide and chlorine in the presence of a catalyst and in a homogeneous mixture.

There is known a process for preparing perchloromethylmercaptane from carbon disulphide and chlorine in homogeneous mixture and in the presence of elementary iodine as catalyst (cf. B. Rathke, Ber. 3, 858 (1870)). Although this process has been known for over 100 years, it is still used in the industry for the production of perchloromethylmercaptane.

Perchloromethylmercaptane is an important intermediate in the synthesis of pesticides e.g. of N-trichloromethylthio-phtalimide and N-trichloromethylthio-tetrahydrophtalimide. In the production thereof the above-mentioned reaction is usual which is carried out at a temperature under 30° C according to the equation

$$2\ CS_2 + a\ Cl_2 \rightarrow 2\ CSCL_4 + x\ S_2Cl_2 + (1-x)\ SCl_2$$

The quantity ratio of the formed sulphur chlorides depends on the size of $a$. By increasing the value $a$ over 6, $x$ approaches the value of 0.

Since iodine which is used as catalyst in the production of perchloromethylmercaptane is an expensive substance, which, besides, is not easily obtained on the market, attempts have been made to replace another catalyst for it.

O. B. Helferich and E. F. Reid report in J. Am. Chem. Soc. 43, 591, (1921) of an unsuccessful attempt to replace iodine by iron, sulphur, charcoal, phosphorus, mercury, zinc, and aluminum. In the presence of iron and at otherwise good consumption of chlorine there resulted carbon tetrachloride instead of the desired perchloromethylmercaptane. In all other cases the absorption of chlorine was low or the chlorination did not occur at all.

For the next 50 years no further efforts in this direction can be detected. All research was directed only towards the obtaining of pure perchloromethylmercaptane from the reaction mixture obtained by the chlorination of carbon disulphide in the presence of elementary iodine as catalyst.

Only in DAS 1,900,659 there is described a process for preparing perchloromethylmercaptane in a gaseous phase, at which carbon disulphide and chlorine are passed through a long tubular reactor charged with charcoal as catalyst. Since the impurities of the product obtained by this process are practically the same as the impurities by the classical process, while this process is undoubtedly much more demanding with regard to the equipment, still today the classical Rathke's process in homogeneous phase with iodine as catalyst (cf. Angew. Chem. 82, 63 (1970)) is used everywhere.

As all previous attempts of preparing perchloromethylmercaptane had been carried out in a heterogeneous phase, it was our aim to replace the iodine in homogeneous phase with another catalyst.

It was surprisingly found that iodine can be replaced by heavy metal salts that are soluble in carbon disulphide.

The process according to the invention for preparing perchloromethylmercaptane from carbon disulphide and chlorine in homogeneous phase and in the presence of a catalyst is consequently characterized in that heavy metal salts that are soluble in carbon disulphide are used as catalysts.

As heavy metal salts soluble in carbon disulphide fatty acid salts with 7-20 carbon atoms, thallates, naphtenates or resinates can be taken into consideration. It has to be noted that anionic salt component is not essential. The presence of heavy metal cations is essential for the process according to the invention and so a heavy metal has to be chosen which is soluble in carbon disulphide. The above salts have these characteristics.

The temperature at which the process according to the invention is carried out is 0°–100° C, which corresponds to the temperature of the classical process with iodine as catalyst.

For the process according to the invention especially salts of metals of the IIIrd and IVth group of periodic system with the exception of iron are to be considered. Of these salts, salts of lead, zinc, bismuth, antimony and tin are preferred.

The choice of the anionic salt component is not critical. For the process according to the invention it is only important that the salt is soluble in carbon disulphide, while the anionic component itself takes no part in catalysis.

The reaction mixture obtained according to the invention, which beside perchloromethylmercaptane also contains sulphur dichloride and sulphur chloride, is processed according to the known processes.

Compared with the known processes, the process according to the invention has following essential advantages:

1. it can be applied on the already existing equipment,
2. the use of catalysts that are used in the process according to the invention is much more economical,
3. both heavy metal and fatty acid can be separated during the process without difficulties and in a technically usable form.

The invention is further illustrated by preparation examples which are only illustrative and not limitative.

EXAMPLE 1

In a four-necked three-liter flask equipped with a thermometer, reflux cooler and inlet tube with frit, 800 gs. (635 mls.) of carbon disulphide dried over calcium chloride were given, then 4.28 gs. of lead (II) isononate with a 37.4 % content of lead (0.2 % of lead (II) ion calculated on the weight of carbon disulphide) were added and the mixture was stirred for 15 minutes at cooling to 10° C.

Then it was started with introduction of chlorine in a quantity of 750 gs./hr./kg. of carbon disulphide, whereby the temperature after 5 minutes reached 35° C, which in the next minute was lowered to 24° C by intensive cooling. In the following, the temperature was maintained in the range of 20° to 25° C and within 3 hrs. of chlorination there was introduced a total of 1,900 gs. of chlorine, 1,860 gs. of which, i.e., 98 % of theory, were absorbed, i.e., such a quantity that the molar ratio of chlorine to carbon disulphide amounted to 2.5.

After terminated introduction of chlorine, the chlorination mixture was stirred for further 30 minutes, cooled to 10° to 15° C and the separated lead chloride removed on a suction filter. The remaining 2,580 gs. of chlorination mixture were distilled in the atmosphere of chlorine at heating to 50° C and in a vacuum of 100 mms. Hg, whereby 100 gs. of chlorine were consumed. The temperature on the top of a 50 cms. Vigreux column reached 33° C. Within 1 hour 800 gs. of distillate were obtained.

1,500 gs. of light-brown distillation residue (i.e., 76.6 % calculated on applied quantity of carbon disulphide) with $n_D^{20} = 1.5410$ (which corresponds to 0.8 % content of sulphur monochloride $S_2Cl_2$) were purified according to our Yugoslavian Patent Application P 1018/72 as follows:

In a four-necked three-liter flask equipped with a stirrer, cooler and drop-funnel, 1,480 gs. of the above distillation residue and 1.4 gs. of emulsifier ITA-80 (isotridecylalcohol with 8 moles of ethyleneoxide, produced by the firm TEOL, Ljubljana, Yugoslavia) were given, it was cooled down to 10° to 15° C with a mixture of ice and water and at further cooling with the same mixture, 235 mls. of 65 % nitric acid with $d = 1.4$ were added within 25 minutes at 160 Torrs and at vigorous stirring. The temperature never exceeded 15° C. Then it was stirred for 10 minutes at atmospheric pressure and finally nitric oxides were removed at 115 to 90 Torrs. In a separating funnel the upper acidic layer was separated and 1,260 gs. or 85.2 % of theory of purified product with $n_D^{20} = 1.5389$ were obtained.

This purified product was returned to the reactor and at 10° to 15° C 80 mls. of methanol were added to it within 3 minutes at vigorous stirring, whereby the temperature rose to 18° C. It was stirred for further 12 minutes and then the Bunsen pump was connected. After 15 minutes when the purification was finished, the pressure amounted to 120 Torrs. After standing for 15 minutes, the upper methanolic layer was separated and 1,210 gs., i.e., 96.2 % of theory (after treatment with nitric acid), of a straw-coloured product with $n_D^{20} = 1.5375$ were obtained. The yield was 63 % in relation to the applied quantity of carbon disulphide.

After condensation of perchloromethylmercaptane purified as described above, with phthalimide, 93.5 % of theory of N-(trichloromethylthio)-phthalimide were obtained, having a melting point of 178° to 180° C (corr., theor. 180° C).

EXAMPLE 2

It was chlorinated as described in Example 1, except that 21.4 gs of lead (II) isononate with a 37.4 % content of lead, or 1.0 % of the lead (II) ion, calculated on the weight of carbon disulphide, were used.

It was started with the introduction of chlorine at the temperature of 9° C and by intense cooling the temperature was maintained all the time in the range of 20° to 25° C. 1,900 gs. of chlorine were absorbed.

After filtration of the separated lead chloride, 2,600 gs. of the obtained chlorination mixture were distilled as described in Example 1 and 670 gs. of distillate and 1,675 gs., i.e., 85.5 % of theory, of distillation residue with $n_D^{20} = 1.5448$ were obtained (which corresponds to a 4.20 % content of sulphur monochloride $S_2Cl_2$). By purification as described in Example 1 there was obtained the product with $n_D^{20} = 1.5395$ in a purification yield of 83.5 %, i.e., in a yield of 71.5 % in relation to the applied quantity of carbon disulphide. For purification, 370 mls. of 65 % nitric acid were used which were introduced within 40 minutes.

Then it was purified with methanol as described in Example 1 and a straw-coloured product with $n_D^{20} = 1.5384$ was obtained in a purification yield of 96.5 % (after treatment with nitric acid) and a yield of 69 % in relation to carbon disulphide.

After condenstion of the above product with phthalimide, 93.3 % of theory of N-(trichlormethylthio)-phthalimide with a m.p. of 175° to 178° C were obtained.

EXAMPLE 3

In a four-necked 3-liter flash eqipped with a thermometer, reflux cooler, and inlet tube with frit, 800 gs. (635 mls.) of carbon disulphide dried over calcium chloride and then 53.33 gs. of lead (II) naphthenate with a 15 % content of lead (1.0 % of lead (II) ion calculated on weight of carbon disulphide) were given and it was stirred for 15 minutes at cooling to 10° to 15° C.

At cooling to 20° to 25° C in 200 minutes 2,000 gs. of chlorine were introduced at the ratio of 750 gs./hr./kg. of carbon disulphide, at which the molar ratio of chlorine to carbon disulphide amounted to 2.7.

2,730 gs. of the obtained chlorination mixture were then stirred for futher 10 minutes, the separated lead chloride filtered and 2460 gs. of chlorination mixture were obtained. Within 75 minutes 505 gs. of distillate were distilled at 50° C and 100 Torrs, and 1,830 gs., i.e. 93.4 % of theory, of the product with $n_D^{20} = 1.5489$ to 1.5490 (which corresponds to a 8.0 % content of sulphur monochloride $S_2Cl_2$) were obtained.

When purifying 1,820 gs. of this product analogously to Examples 1 and 2 at a starting temperature of 10° C, then in the temperature range of 15° to 20° C at 165 Torrs within 45 minutes with 590 mls. of 65 % nitric acid, then stirring the mixture for 10 minutes without connected vacuum, removing nitric oxides at 135 Torrs within 50 minutes and finally separating the upper acidic layer, 1,485 gs., i.e., 76.4 % of theory of purified perchloromethylmercaptane with $n_D^{20} = 1.5390$ were obtained.

By extraction with methanol analogously to Examples 1 and 2, 1,440 gs. of a straw-coloured product with $n_D^{20} = 1.5370$ were obtained.

By condensation of this product with phthalimide, 93.2 % of theory of N-(trichloromethylthio)-phthalimide with a m.p. of 171° to 173° C were obtained.

EXAMPLE 4

It was chlorinated as described in Example 1, yet at the temperature of 20° to 25° C and with 15.29 gs. of lead (II) stearate with a 51 % content of lead (1.0 % of lead (II) ion calculated on weight of carbon disulphide) and then stirred for 15 minutes at cooling to 10° C.

It was chlorinated as described in Example 1, at which the temperature increased to 37.5° C within 8 minutes, which temperature was lowered to 26° C in the next minute by intensified cooling. At further chlorination the cooling caused no difficulties. A total of 2,000 gs. of chlorine was introduced, 1,830 gs. of which were absorbed.

The mixture was further treated as described in Example 1 and after removal of the separated lead chloride, 2,495 gs. of chlorination mixture were distilled in an atmosphere of chlorine at 50° C of bath temperature and 107 Torrs for 55 minutes. At a temperature of 36.5° C on the top of the column, 795 gs. of distillate were obtained.

1,575 gs. of brown distillation residue (i.e., 80.5 % calculated on applied quantity of carbon disulphide) with $n_D^{20} = 1.5451$ (which corresponds to a 4.5 % content of sulphur monochloride $S_2Cl_2$) were purified, whereby within 30 minutes 365 mls. of 65 % nitric acid were added and after a total of 60 minutes 1,325 gs., i.e., 67.6 % of theory of purified perchloromethylmercaptane with $n_D^{20} = 1.5391$ were obtained.

After extraction with methanol analogously to the above Examples 65 % of theory of a straw-coloured product with $n_D^{20} = 1.5365$ were obtained.

By condensation of this product with phthalimide, 92.4 % of theory of N-(trichloromethylthio)-phthalimide were obtained with a m.p. of 175° to 177° C.

What we claim is:

1. A process for preparing perchloromethylmercaptane which comprise reacting carbon disulphide and chlorine in homogeneous mixture and in the presence of an effective catalytic amount of a lead salt catalyst wherein said lead salt is soluble in carbon disulphide and thereby preparing perchloromethylmercaptane.

2. The process of claim 1 wherein said lead salt is a lead salt of fatty acid containing 7 – 20 carbon atoms.

3. The process of claim 2 which is carried out at a temperature of 0° to 100° C.

4. The process of claim 1 wherein said process is carried out at a temperature of 0° to 100° C.

5. The process of claim 1 wherein said lead salt is a lead naphthenate.

6. The process of claim 1 wherein said lead salt is a lead resinate.

7. The process of claim 1 wherein said lead salt is a lead stearate.

8. The process of claim 1 wherein said lead salt is lead isononate.

* * * * *